United States Patent
Kaeferlein et al.

(10) Patent No.: US 8,496,160 B2
(45) Date of Patent: Jul. 30, 2013

(54) METHOD FOR POSITIONING TWO COMPONENTS USING TACK WELDS CROSSING THE JOINT LINE

(75) Inventors: Michael Kaeferlein, Stein (DE); Thomas Kretschmar, Bamberg (DE); Clemens Pletzenuer, Nuremberg (DE); Axel Bormann, Bamberg (DE); Hans Miethsam, Buechenbach (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 12/992,769

(22) PCT Filed: Dec. 19, 2008

(86) PCT No.: PCT/EP2008/067981
§ 371 (c)(1),
(2), (4) Date: Dec. 21, 2010

(87) PCT Pub. No.: WO2009/138142
PCT Pub. Date: Nov. 19, 2009

(65) Prior Publication Data
US 2011/0095071 A1 Apr. 28, 2011

(30) Foreign Application Priority Data
May 15, 2008 (DE) .......................... 10 2008 001 798

(51) Int. Cl.
*B23K 31/02* (2006.01)
(52) U.S. Cl.
USPC ............................ 228/178; 228/101; 228/182
(58) Field of Classification Search
None
See application file for complete search history.

(56) References Cited

U.S. PATENT DOCUMENTS

| | | | |
|---|---|---|---|
| 1,450,935 A * | 4/1923 | Anderson | 403/270 |
| 2,792,621 A | 5/1957 | Howell | |
| 3,815,219 A | 6/1974 | Wilson | |
| 3,860,778 A * | 1/1975 | Rudd et al. | 219/67 |
| 4,278,478 A | 7/1981 | Tidquist | |
| 4,522,859 A | 6/1985 | Blair | |
| 4,875,619 A | 10/1989 | Anderson et al. | |
| 2004/0099712 A1 * | 5/2004 | Tonkovich et al. | 228/193 |
| 2007/0017960 A1 | 1/2007 | Talwar | |
| 2007/0040002 A1 | 2/2007 | Talwar | |

FOREIGN PATENT DOCUMENTS

| | | |
|---|---|---|
| DE | 10351779 B3 | 2/2005 |
| EP | 1745882 A1 | 1/2007 |
| JP | 9141468 A | 6/1997 |
| JP | 09206969 A * | 8/1997 |

OTHER PUBLICATIONS

Machine Translation of JP 09-206969.*

* cited by examiner

*Primary Examiner* — Maria Veronica Ewald
*Assistant Examiner* — Megha Mehta
(74) *Attorney, Agent, or Firm* — Maginot, Moore & Beck

(57) ABSTRACT

The invention relates to a method for positioning two components to be joined to each other along a common joint line. According to the invention, the two components are connected to each other by limited-length tack welds firmly connecting the two components, particularly by way of bonding, to each other. In order to obtain reliable and robust positioning of the components for tacking during the joining process, without requiring extensive production apparatuses, such as is required for the high-precision setting of the focal point of the welding laser relative to the joint line, the tack welds are designed such that they cross the joint line.

16 Claims, 1 Drawing Sheet

METHOD FOR POSITIONING TWO COMPONENTS USING TACK WELDS CROSSING THE JOINT LINE

CROSS-REFERENCE TO RELATED APPLICATION

This application is a 35 USC 371 application of PCT/EP2008/067981 filed on Dec. 19, 2008.

BACKGROUND OF THE INVENTION

1. Field of the Invention

The invention is based on a method for positioning two components, to be connected to one another along a common joint line.

2. Description of the Prior Art

Components that are to be connected to one another, for instance by soldering, must be positioned positionally correctly to one another for the connection process—also called the joining process—and the positioning must be maintained during the joining process. The precision and durability of the positioning and the gap between the components to be joined along the joint line are of decisive significance, particularly in the automated joining process, for a high-quality outcome of the process.

The object of the invention is to create a spring retaining sleeve which makes economical production of a stable press-fit assembly possible.

SUMMARY OF THE INVENTION

The method according to the invention for positioning the components has the advantage that because of how the tack welds are embodied according to the invention, in such a way that they cross the joint line at least once; that is, they intersect the joint line at an angle that is other zero, reliable tacking between the components to be joined is produced, without having to make stringent demands in terms of the positioning of the welding laser or of the adjustment of the focal point of the welding laser with regard to the joint line. Moreover, existing joining gaps between the components are bridged quite well by the tack welds.

BRIEF DESCRIPTION OF THE DRAWINGS

The invention is described in further detail in the ensuing description in terms of exemplary embodiments shown in the drawings. In the drawings.

DESCRIPTION OF THE PREFERRED EMBODIMENTS

Figure 1:
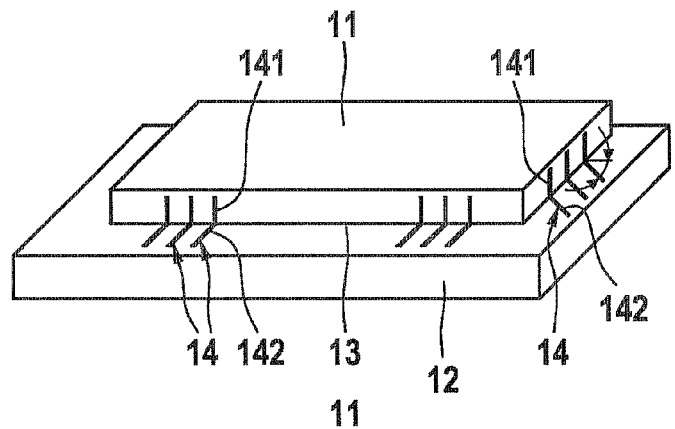
FIG. 1 shows a perspective view of two platelike components to be joined together, of a first embodiment of the tack welds for positioning them.
Figure 2:
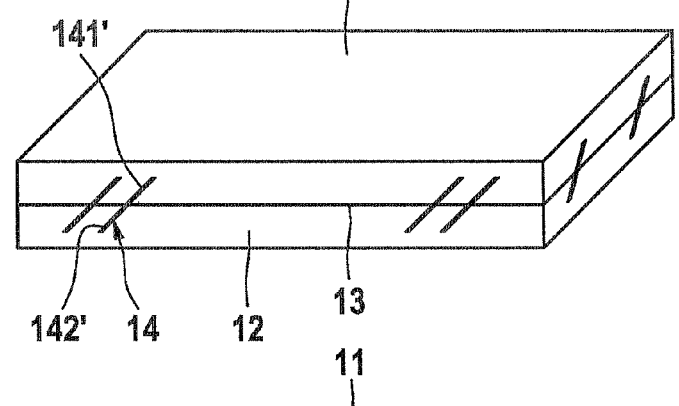
FIG. 2 shows a perspective view of two platelike components to be joined together, of a second embodiment of the tack welds for positioning them.

In FIG. 1, two metal platelike components 11, 12 of different sizes are shown, which rest on one another and are to be connected to one another by hard soldering in material-locking fashion, or in other words joined. The hard soldering process is done in an automated way and necessitates precise positioning of the two platelike components 11, 12 relative to one another, and this positioning must be maintaining unchanged throughout the entire soldering process. The joint line, as a visible boundary of the joining face at which the two platelike components 11, 12 are to be soldered together is marked 13. For the hard soldering process, the two components 11, 12 are placed on one another in a precise position, and this positioning is fixed by the creation of tack welds 14 in such a way that it remains unchanged during the entire joining process. To that end, the tack welds 14, which are made as narrow lines of weld having a limited length and which are created by means of a welding laser as weld seams, are embodied in such a way that they cross the joint line 13. The crossing angle can be selected arbitrarily from an angular range between 90° and >0°. Preferably, to create the weld seams, the known process of remote welding is employed, with which a very high processing speed can be achieved. As shown in FIG. 1, the tack welds 14 are preferably made in groups, in spaced-apart regions of the joint line 13. Each tack weld 14 has two legs 141, 142, of which one leg 141 extends in the component 11, and the other leg 142 extends in the component 12. The two legs 141, 142 are oriented in such a way that they are located in one plane. However, one leg may also be placed counter to the plane, as is shown in FIG. 1 for the tack welds 14 disposed in the lateral region (hence the legs 142 are shown). In the exemplary embodiment of FIG. 1, as an example three tack welds 14 are present in each group, and extend parallel to one another at a slight spacing from one another.

With platelike components 11, 12 of equal size, as are shown in FIGS. 2 through 5, the tack welds 14 are made at the face ends of the components 11, 12. In the exemplary embodiment of FIG. 2, the tacking operations are done such that the tack welds 14 cross the joint line 13 at an angle of 45°. The tack welds 14 are embodied rectilinearly, and one weld portion 141' extends within the component 11, and one weld portion 142' extends within the component 12.

Figure 3:
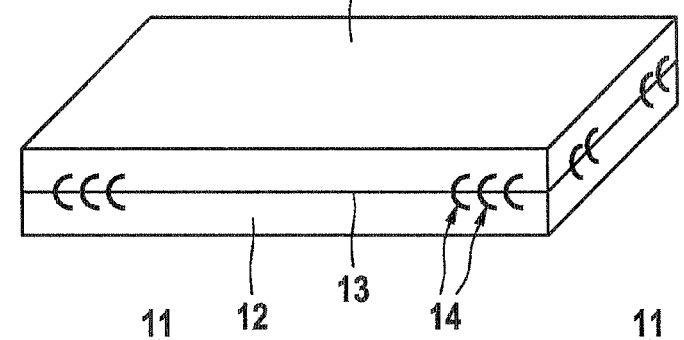
FIG. 3 shows a perspective view of two platelike components to be joined together, of a third embodiment of the tack welds for positioning them.

Instead of the rectilinear embodiment of the tack welds 14, they may also be embodied in curved form, as is shown in FIG. 3. The curved shape is arbitrary and may for instance be an open or closed circular arc. Also in the exemplary embodiment of FIG. 3, in each group in each of the spaced-apart regions of the joint lines 13, three tack welds 14, for instance, are provided, which have been made with slight spacing and separately from one another, extending beyond the joint line 13 into the face ends of the two components 11, 12.

Figure 4:
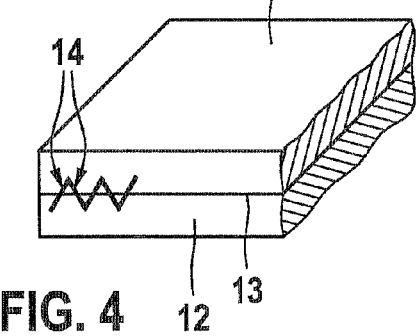
FIG. 4 shows the same view as in FIGS. 1 through 3, of a further embodiments of the tack welds.
Figure 5:
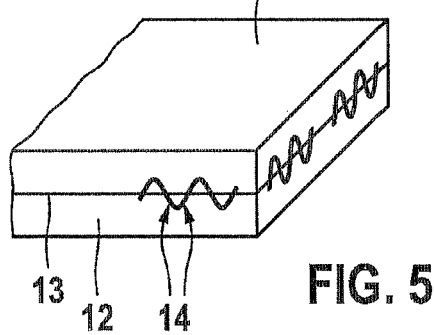
FIG. 5 shows the same view as in FIGS. 1 through 3, of a further embodiment of the tack welds.

In the exemplary embodiments of FIGS. 4 and 5, the tack welds 14, in the spaced-apart regions of the joint line 13, are embodied as a cohesive line, which in the exemplary embodiment of FIG. 4 forms a zigzag line and in the exemplary embodiment of FIG. 5 forms a sinusoidal wavy line.

It is understood that the method of the invention for positioning components is not limited to platelike components. For instance, hollow-cylindrical components, which with their cylinder axes stand vertically to one another, can be fixed to one another by way of the tack welds 14 in the various embodiments described.

The type of tacking is not limited to the production of weld seams as tack welds in metal components. Similar tack welds can also be used for fixing components before the thermal hardening of adhesive bonds that are employed for joining the components.

The foregoing relates to the preferred exemplary embodiments of the invention, it being understood that other variants and embodiments thereof are possible within the spirit and scope of the invention, the latter being defined by the appended claims.

The invention claimed is:

1. A method for positioning two components, which are to be connected to one another along a common joint line, in which method has the steps of:
fixing the two components to one another by at least two limited-length tack welds, each of which limited-length tack weld is constituted as a narrow line of weld which has a length which is substantially greater than its width, said tack welds connecting the two components solidly to one another in material-locking fashion; and wherein the narrow line of each tack weld crosses the common joint line of the two components,
wherein each of the tack welds includes a first leg that extends on a first of the two components and a second leg that extends on a second of the two components,
wherein each of the tack welds is spaced apart from and not contacting any of the other tack welds,
wherein the joint line is defined by a first surface of a first component and a second surface of a second component, and
wherein the first surface and the second surface are arranged substantially perpendicular to each other.

2. The method as defined by claim 1, wherein the angle at which the narrow line of each of the tack welds crosses the common joint line is selected from an angular range between 90° and >0°.

3. The method as defined by claim 2, wherein the tack welds are made in groups of two or more tack welds which, if there are more than two tack welds in a group, the tack welds are approximately equally spaced along the common joint line, and wherein the groups of tack welds are spaced apart from one another with a spacing which is greater than the spacing of the tack welds of each group.

4. The method as defined by claim 3, wherein the narrow line of each of the tack welds of one group are made parallel to one another, with a slight spacing from one another.

5. The method as defined by claim 4, wherein the tack welds are embodied as straight or curved individual lines.

6. The method as defined by claim 2, wherein the components are made of metal, and the tack welds are embodied as weld seams.

7. The method as defined by claim 6, wherein the weld seams are created by remote welding.

8. The method as defined by claim 1, wherein the components are made of metal, and the tack welds are embodied as weld seams.

9. The method as defined by claim 8, wherein the weld seams are created by remote welding.

10. A method for positioning two components, which are to be connected to one another along a common joint line, in which method has the steps of:
fixing the two components to one another by at least two limited-length tack welds, each of which limited-length tack weld is constituted as a narrow line of weld which has a length which is substantially greater than its width, said tack welds connecting the two components solidly to one another in material-locking fashion; and wherein the narrow line of each tack weld crosses the common joint line of the two components,
wherein the tack welds are made in groups of two or more tack welds wherein, if there are more than two welds in a group, they are approximately equally spaced along the common joint line,
wherein each of the tack welds includes a first leg that extends on a first of the two components and a second leg that extends on a second of the two components,
wherein each of the tack welds in each of the groups is spaced apart from and not contacting any of the other tack welds, and
wherein there are at least two groups of tack welds, which groups are spaced apart from one another with a spacing which is substantially greater than the spacing of the tack welds within each group,
wherein the joint line is defined by a first surface of a first component and a second surface of a second component, and
wherein the first surface and the second surface are arranged substantially perpendicular to each other.

11. The method as defined by claim 10, wherein the narrow line of each of the tack welds of one group are made parallel to one another, with a slight spacing from one another.

12. The method as defined by claim 11, wherein the tack welds are embodied as straight or curved individual lines.

13. The method as defined by claim 12, wherein the components are made of metal, and the tack welds are embodied as weld seams.

14. The method as defined by claim 11, wherein the components are made of metal, and the tack welds are embodied as weld seams.

15. The method as defined by claim 10, wherein the components are made of metal, and the tack welds are embodied as weld seams.

16. The method as defined by claim 15, wherein the weld seams are created by remote welding.

* * * * *